(12) United States Patent
Maier-Laxhuber et al.

(10) Patent No.: US 6,349,560 B1
(45) Date of Patent: Feb. 26, 2002

(54) APPARATUS AND METHOD FOR THE COOLING OF A LIQUID IN A CONTAINER

(75) Inventors: Peter Maier-Laxhuber, Dietersheim; Andreas Becky, Ottobrunn; Gert Richter, Unterschleissheim; Reiner Worz, Munich, all of (DE)

(73) Assignee: Zeo-Tech Zeolith-Technologie, GmbH, Unterschleissheim (DE)

( * ) Notice: Subject to any disclaimer, the term of this patent is extended or adjusted under 35 U.S.C. 154(b) by 0 days.

(21) Appl. No.: 09/574,091

(22) Filed: May 18, 2000

(30) Foreign Application Priority Data

May 19, 1999 (DE) .......................... 199 22 848

(51) Int. Cl.[7] .......................... F25B 21/00; F25B 17/08
(52) U.S. Cl. .......................... 62/457.9; 62/480
(58) Field of Search .......................... 62/457.9, 480, 62/457.1, 457.2, 457.3, 457.4, 371, 294

(56) References Cited

U.S. PATENT DOCUMENTS

| 2,144,441 | A | * | 1/1939 | Schlumbohm |
| 3,411,318 | A | * | 11/1968 | Puckett |
| 3,642,059 | A | * | 2/1972 | Greiner .................... 62/476 X |
| 4,205,531 | A | * | 6/1980 | Brunberg et al. ......... 62/480 X |
| 5,186,020 | A | * | 2/1993 | Rockenfeller et al. ..... 62/457.9 |
| 5,518,069 | A | * | 5/1996 | Maier-Laxhuber et al. ... 62/480 X |
| 5,816,069 | A | * | 10/1998 | Ebbeson .................... 62/457.9 |

* cited by examiner

Primary Examiner—Henry Bennett
Assistant Examiner—Chen-Wen Jiang
(74) Attorney, Agent, or Firm—Hoffmann & Baron, LLP

(57) ABSTRACT

Method and apparatus for the cooling of a liquid (4) within a container (3) by means of a liquid cooler (1), which absorbs a working agent vapor through a sorbent (14) from an evaporator (8), which is in thermal contact with the liquid (4) to be cooled, and wherein during the regeneration of the sorbent (14), the working agent vapor flows back into the evaporator (8) and during condensation, releases its condensation heat to a liquid (4) in the container (3).

9 Claims, 3 Drawing Sheets

APPARATUS AND METHOD FOR THE COOLING OF A LIQUID IN A CONTAINER

BACKGROUND OF THE INVENTION

1. Field of the Invention

The invention concerns a liquid container and a method for the cooling of a liquid in a container by means of a sorption device.

2. Description of the Prior Art

Sorption apparatuses are apparatuses in which a liquid or solid sorbent absorbs a second, higher-boiling agent, the working agent, in the form of a vapor, with the release of heat. The working agent thereby evaporates in an evaporator with the absorption of heat. After the sorbent is saturated, it can be desorbed, once more, by supplying heat. The working agent thereby evaporates from the sorbent. The working agent vapor can be reliquified and subsequently evaporated, once again, in the evaporator.

Sorption apparatuses for cooling with solid sorbents are known from EP 0 368 111 and DE-OS 34 25 419. Sorbent containers, filled with sorbents, thus draw off the working agent vapor that is formed in an evaporator and absorb it in the sorbent charging with the release of heat. The sorption heat must thus be conducted away from the sorbent charging. The cooling apparatuses can be used for cooling and keeping warm foods in thermally insulated boxes.

The sorption cooling system known from EP 0 368 111 consists of a portable cooling unit and a stationary charging station, which can be separated from it. The cooling unit consists of an adsorption container, filled with a solid sorbent, and an evaporator, which contains a liquid working agent and a heat exchanger embedded therein. The evaporator and the adsorption container are connected to one another via a vapor conduit, which can be sealed off. Liquid media, which are cooled by the temperature-regulated opening and closing of the sealing-off device to the desired temperature level, flow through a heat exchanger embedded in the evaporator. After the adsorption agent is saturated with the working agent, it can be heated in a charging station. The working agent vapor thus flowing off is reliquified in the evaporator. The condensation heat is thereby conducted off through cooling water, which must flow through the embedded heat exchanger. The sorption cooling system is expensive to produce because of the embedded heat exchanger and the temperature regulation and too complicated to be used practically by the untrained layperson.

The goal of the invention is to provide a more easily handled and cheaper apparatus in comparison to the state of the art.

The goal is attained by the characterizing features of the independent claims. The dependent claims indicate other inventive method steps and apparatuses.

A sorption apparatus in accordance with the invention accordingly contains a sorbent within a sorbent container, a vapor conduit, which can be sealed off, and a liquid working agent within an evaporator. The evaporator is in good thermal contact with a liquid, which is held in a container. The components are firmly connected to one another and remain this way even during all of the processing steps.

During the regeneration phase, the sorbent is heated and the working agent vapor desorbed. It flows through the sealable vapor conduit to the evaporator and condenses out there. The condensation heat is absorbed by the liquid in the container with an increase in temperature. At the end of the regeneration, the supply of heat to the sorbent is interrupted. The desorption of additional working agent vapor ends in this way. The desorbed working agent is found in liquid form in the evaporator. The vapor conduit is sealed off. The sorbent cools to ambient temperature by the release of heat via the walls of the sorbent container.

To introduce the cooling phase, the sealed-off vapor conduit is opened. The working agent vapor can then flow from the evaporator into the sorbent container and be exothermally absorbed by the sorbent. The evaporating working agent quantity in the evaporator and the liquid surrounding it are cooled. In order to produce the maximum amount of cooling in a short time, the sorbent must be actively cooled. A particularly intensive cooling effect is attained if the absorption container is surrounded by a sufficiently large water mass which absorbs the sorption heat, or a smaller quantity of water can evaporate with the absorption of heat by the sorbent container wall. Advantageously, the container walls should be cooled to temperatures of less than 50° C. Then sufficiently low temperatures are possible in the evaporator.

Only the liquid volume that is found around and below the evaporator is cooled, in accordance with the invention. The upper liquid volume remains close to the starting temperature because of the lower density and the lower heat conduction of liquids. By suitably positioning and shaping the evaporator, the liquid volume to be cooled can be preselected. In actual practice, a more rapid cooling of the lower liquid quantity, which is then removed first, is attained in this way. The upper liquid quantity is first cooled, when it drops into the area of the evaporator, by tapping the cooled quantity.

In general, the container is cleaned before it is refilled. For this purpose, cleaning and rinsing liquid is conducted into the container and, as a rule, again drained when the container is tilted. The evaporator is shaped in such a way that the container can be emptied in all cleaning processes without problem and without leaving behind any rinsing agent residue. The evaporator walls, which are in contact with the liquid, are smooth and without retention indentations. Lens-shaped and cylindrical configurations have proved useful.

The interior space of the evaporator should be shaped in such a way that the aqueous filling, which is removed by evaporation, wets the entire surface of the wall for as long as possible, so as to utilize the entire heat exchanger surface. In accordance with the invention, retention devices, such as hygroscopic surface coatings or bowl-shaped components are used for this purpose.

The use of zeolite/water as the adsorption substance is particularly advantageous. Zeolite is a crystalline mineral, which consists of a regular framework structure of silicon and aluminum oxides. This framework structure contains small cavities, in which water molecules can be adsorbed with the release of heat. Within the framework structure, the water molecules are exposed to strong field forces which liquefy the molecules in the lattice and bind them in a phase similar to a liquid. The strength of the binding forces acting on the water molecules is dependent on the water quantity already contained in the framework structure and the temperature of the zeolite. For practical use, up to 25 g water can be adsorbed per 100 g zeolite. The cooling volume which can be produced is thereby sufficient to cool 1 L water 14K. Zeolites are solid substances without a disturbing heat expansion in the sorption or desorption reaction. The framework structure is freely accessible for the water vapor molecules from all sides. The apparatuses can therefore be used in any position.

The use of water as the working agent permits the reduction of the required regulation expenditure to a minimum. Upon evaporating water under a vacuum, the water surface cools to 0° C. and freezes to ice with continued evaporation. This ice layer grows rapidly until the pressure decline, which occurs due to the ice layer, stops the growth. The ice layer can be used advantageously to regulate the liquid temperature. With a low heat supply, the ice layer grows until a very large supply of heat melts it. By the natural formation of ice, the heat transfer from the liquid to the evaporator is reduced, so that the liquid does not cool below 0° C. and usually, remains at 4–5° C.

Substances that lower the freezing point can also be admixed to the aqueous evaporator content if the tapping temperature of the liquid is to be lowered below 4° C. or an icing over of the evaporator filling is to be prevented.

Other sorbent pairings, however, can also be used, in which the sorbent is solid and also remains solid during the sorption reaction. Solid sorbents have low thermal conductivity and poor heat transfer. Since the heat transfer of gaseous media (air, waste gases) to the sorbent container lies within the same order of magnitude, heat exchangers without ribs, such as plates, tubes, or even corrugated tubing, are recommended, in principle. Some solid sorbents, such as zeolites, are also stable enough to compensate for outside excess pressures on thin-walled heat exchanger surfaces. Additional reinforcements or thick-walled heat exchanger surfaces are therefore unnecessary. Since with the use of water as the working agent the sorption apparatus is under vacuum and no gases should penetrate into the system during the entire period of functioning, the known vacuum-tight components are to be preferred for the sealing-off device. For manual actuation, ducts which are sealed off by means of metal bellows have proven particularly useful.

The absorption container which is being heated during the exothermal absorption reaction should be thermally decoupled from the container, so as to avoid a reheating of the liquid. Advantageously, the sorbent container can be placed below the container or above the container. In the first case, it can be cooled by immersion into a basin filled with water, and for the regeneration, it can be placed on an electrically heated heating plate. In the second case, warm air rising from the absorption container cannot sweep the container and reheat the already cooled liquid.

For an economical mode of operation, sorbent temperatures of 200–300° C. are recommended during the regeneration and of 40–80° C. during the absorption. Since zeolite granules especially have low thermal conductivity, the absorption container must be laid out in such a way that the heat conduction path for the reacted heat quantities does not exceed about 3 cm. All apparatuses which attain the required temperature level and do not unnecessarily heat the liquid in the container are suitable as heat sources for the regeneration. Electrically heated plates or cartridges, which are adapted to the configuration of the sorbent containers are advantageous. The heating can, for example, also be arranged for several liquid coolers in one pallet, so as to utilize production-influenced storage times for the regeneration after the filling of the containers. Heating apparatuses which heat the sorbent charging via radiant or inductive heat (eddy currents) are also advantageous. Of course, it is also possible to permanently connect the heating device with the absorption container and also to leave the device on it when transporting a portable liquid cooler.

It may also be advantageous to optimize the configuration of the sorbent container for the release of heat during the absorption phase. In the case of the release of heat to the surrounding air, large, flow-conducive heat exchanger surfaces are preferred, whereas in the case of evaporative or water cooling, holding basins or water-storing surface coverings (for example, paper banderoles with advertisements).

No special demands are made on the size and configuration of the containers. Thus, all containers common at present (for example, vats, containers, cans, open containers, foil sacks, multilayer packagings, plastic containers, canisters, hobbocks, bottles, jugs, and so forth) which are suitable for flowable filling materials can be used, as long as the sorption apparatus can be coupled for proper operation.

Three liquid coolers in accordance with the invention are depicted in the drawing.

DETAILED DESCRIPTION OF THE INVENTION

Figure 1:
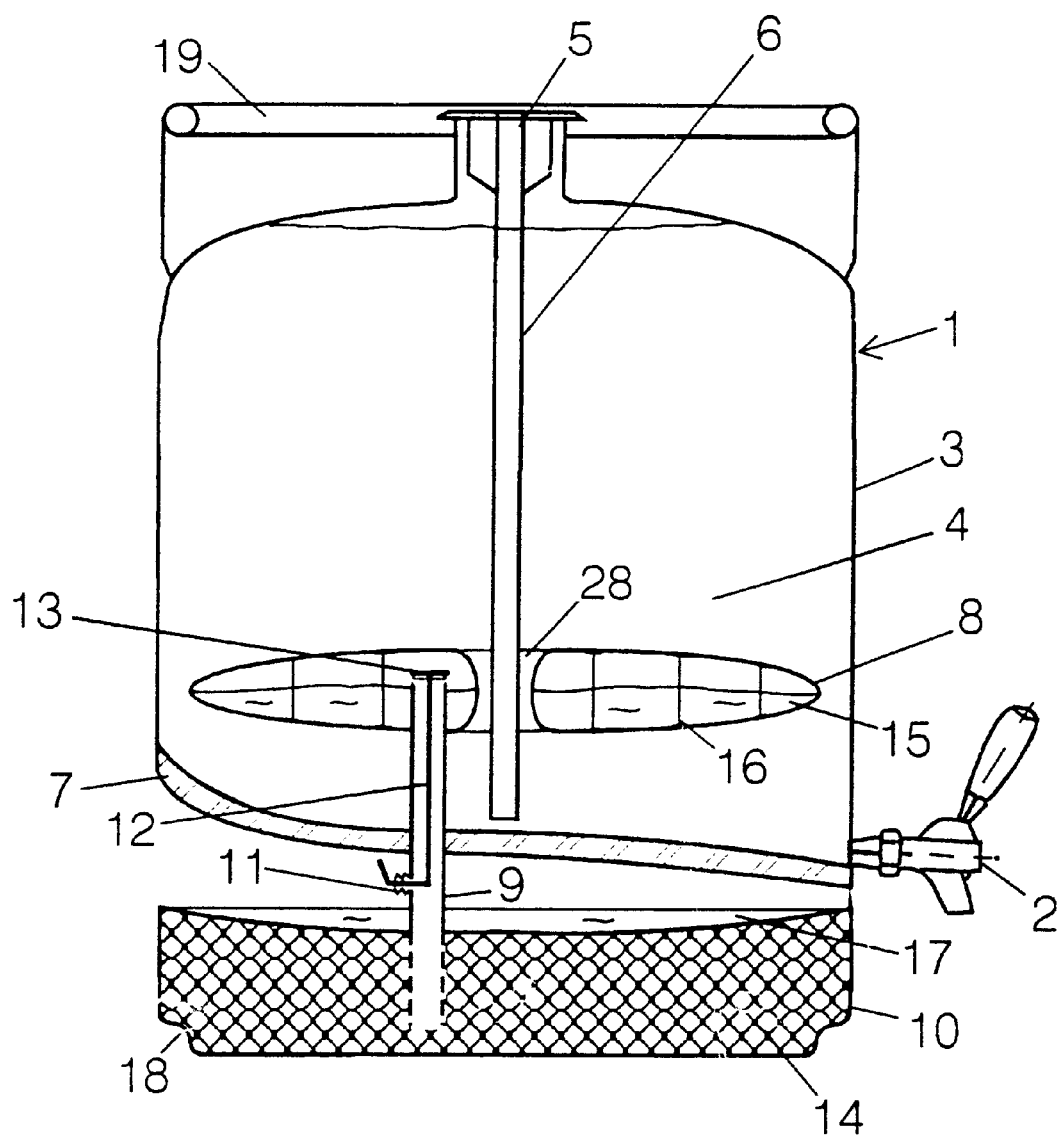
FIG. 1, a liquid cooler combined with a beverage container in sectional representation.

In all three figures, a liquid cooler 1, in accordance with the invention, is shown combined with beverage containers. In the lower outlet of the containers 3, there are taps 2, through which the cooled beverages 4 in the containers 3 can be removed. The containers 3 have a fitting 5 in the upper area, with an ascending tube 6 extending to the bottom of the container. The beverage container is cleaned and filled, according to known methods, via the fitting 5 and the ascending tube 6, without the sorption apparatus requiring any special attention. Thermal insulation 7, which prevents reheating of the cooled beverages, is applied to the bottoms of the containers 3. The evaporators 8, with aqueous working agents 15, are located in the containers 3. A sealable vapor conduit 9 leads from the containers to the sorbent containers 10, which are located outside the containers 3 and which are filled with granulated zeolite-sorbent 14. Each of the sealable vapor conduits 9 contains a metal bellows 11, through which a manually actuatable connecting rod 12 can open and close a valve disk 13 at the end of the vapor conduit 9 in the evaporator 8. The connecting rod 12 is thereby adjusted in such a way that with a nondeflected metal bellows 11, the valve disk 13 is drawn onto the opening of the vapor conduit 9. A backflow of water vapor from the evaporator 8 into the sorbent container 10 is stopped until the metal bellows 11 is deflected and the valve disk 13 is lifted. During the regeneration phase, in which water vapor flows back into the evaporator 8, the valve disk 13 automatically clears the path for the vapor flow.

The liquid cooler 1, according to FIG. 1, contains a lens-shaped evaporator 8 in the lower third of the container 3. The evaporator 8 is filled to approximately the halfway point with water (liquid working agent 15). A penetration site 28 is formed in the middle of the evaporator, through which the ascending tube 6 extends to the bottom of the container. The penetration site 28 permits sufficient distance to the ascending tube 6 to ensure a sufficient flow of rinsing agent during the cleaning process. Stabilization and heat conduction ribs 16 made of copper are placed in the evaporator 8 against the excess pressure of the beverage 4. Through heat conduction, the upper evaporator half which is not wetted with water is also cooled. In this way, the entire evaporator surface is available as a cooling surface for the beverage 4. This is cooled only below and lateral to the evaporator 8 during the cooling phase. The upper liquid of the container remains uncooled until it drops into the area of the evaporator 8 by tapping the cooled liquid above the tap 2. On the side facing the container, the absorption container 10 has a hollow 17 filled with water. This quantity of water can conduct the absorbed heat away from the sorbent 14. The underside of the sorbent container 10 has a surrounding recess 18, with which the liquid cooler 1 can be placed in the upper bung ring 19 of a second container when they are stacked.

Figure 2:
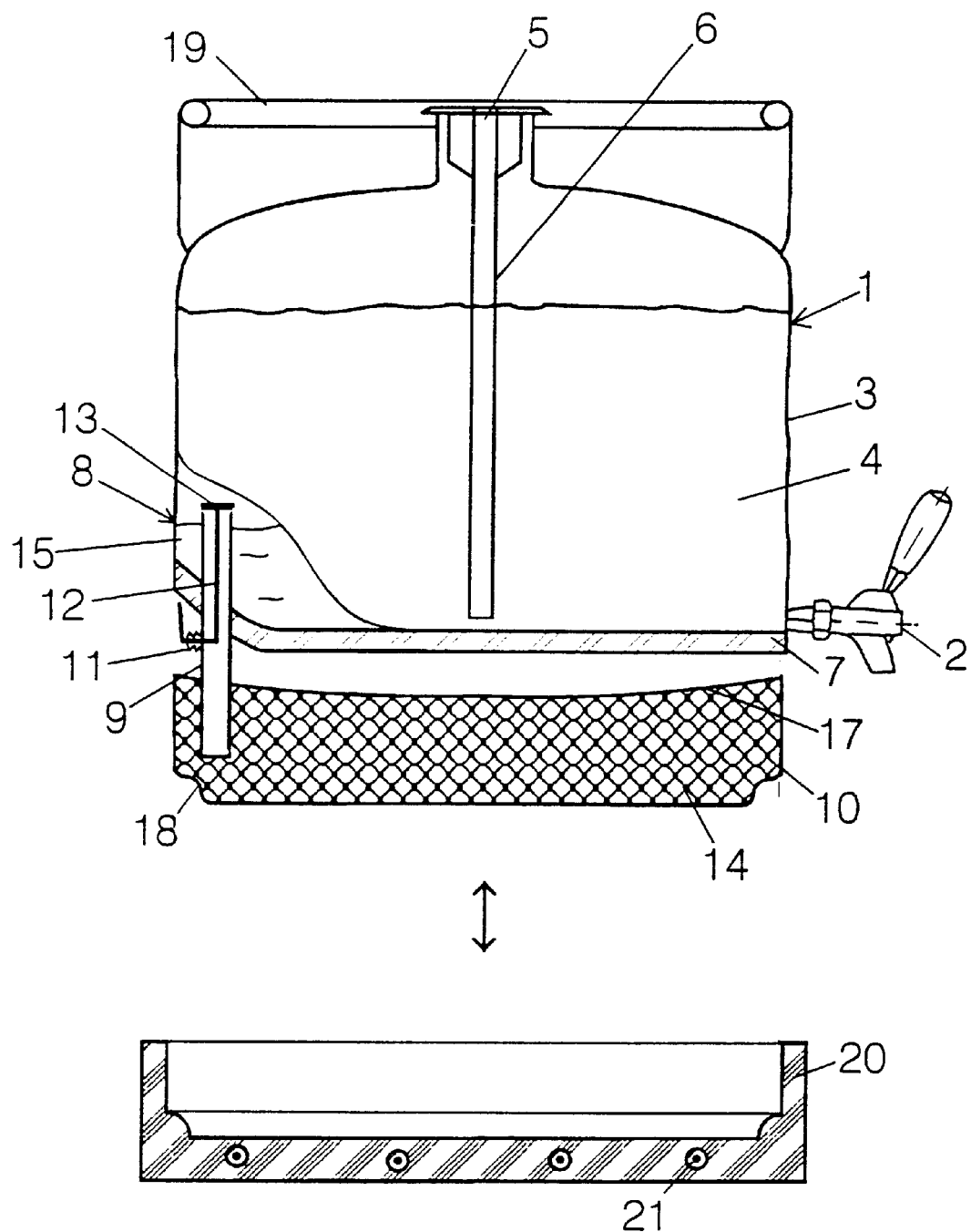
FIG. 2, a liquid cooler, analogous to FIG. 1, with a lens-shaped evaporator.

The liquid cooler 1 according to FIG. 2 differs from the cooler according to FIG. 1 only in the setup of the evaporator 8. This is integrated here annularly into the lower container wall. This evaporator form can also have additional heat conduction ribs. In comparison to the version from FIG. 1, this model can be cleaned in a simpler manner. A heating plate 20 is shown, in sectional representation also, with electric heating elements 21, below the absorption container 10. The liquid cooler 1 is placed on it for the regeneration and the sorbent 14 is heated.

Figure 3:
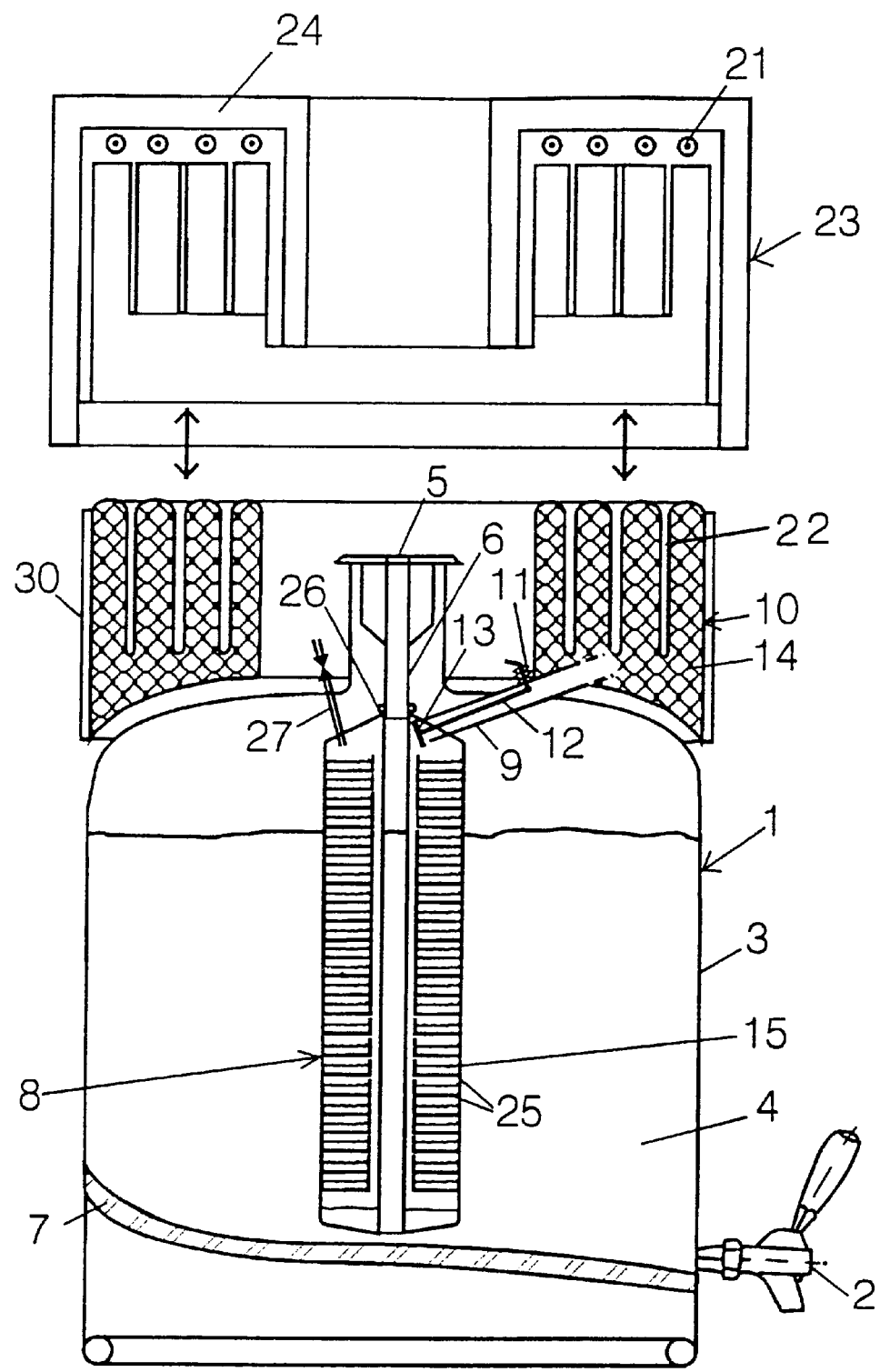
FIG. 3, a liquid cooler with sorbent container situated above, also in sectional representation.

The liquid cooler 1 according to FIG. 3 has an absorption container 10 located above the container 3. This is situated annularly around the fitting 5 and provided with annular retention devices 22. A heating hood 23, also equipped with electrical heating elements 21 and an insulation cover 24, is stuck into these retention devices during the regeneration phase. The sorbent 14 can be quickly heated by means of this configuration, since at the same time, the heat conduction path within the sorbent container 10 is shortened by the retention devices 22. During the absorption process, the retention devices 22 are filled with water. This water and additional water, which arrives at a banderole 30, wrapped around the sorbent container 10, removes the absorbed heat by evaporation.

The evaporator 8 has a cylindrical form and is situated vertically in the middle of the container. The ascending tube 6 is in sections and in the lower region it is also part of the cover of the evaporator. In the upper part, the ascending tube 6 can be stuck on the evaporator via a sealing element 26. In this evaporator version, the beverage 4 is thus additionally cooled while it flows through the ascending tube 6 if it is tapped via the ascending tube 6 and the fitting 5. The evaporator 8 itself contains copper pans 25 in the interior area, in which the aqueous working agent 15 is distributed over the entire evaporation cover. A flow path for the water vapor is left free between the lower ascending tube part and the copper pans 25.

The liquid cooler 1 shown in FIG. 3 also includes a suction conduit 27 that empties into the evaporator 8. The suction conduit 27 is normally closed but is opened to evacuate the sorbent container 10 through the conduit when required.

All evaporator and sorbent container models shown in the drawings can be combined with one another and can be used on all cleaning and filling units in current use.

In accordance with the invention, the liquid coolers 1 are regenerated by applying the heating devices after refilling with beverages. The water vapor desorbed during the heating of the sorbent 14 flows through the opening valve disk 13 into the evaporator 8 and condenses on the walls. The beverages absorb the condensation heat and are heated. The heating is approximately as great as the subsequent cooling—that is, as a rule, about 20–25 K. Beer, for example, is drawn off at relatively low temperatures of 4–5° C. The subsequent heating by the regeneration process therefore corresponds to the heating to the ambient temperature, which follows in any case.

To start the sorption process, the connecting rod 12 is deflected and fixed. Water vapor flows from the evaporator 8 to the sorbent charging 14. The beverages cool off on the outside surfaces of the evaporator. The cooling rates of the beverage 4 are about 1 K/min—that is, approximately 20 min after the opening of the valve disk 13, the first beverage can be tapped at about 5° C. The entire beverage contents, cooled, can be tapped within 2 h.

What is claimed is:

1. A method for the cooling of a liquid in a container by means of a liquid cooler having a sorbent container containing a sorbent which absorbs a working agent vapor from an evaporator, the evaporator being in thermal contact with the liquid to be cooled, characterized in that during the regeneration of the sorbent, the working agent vapor flows back into the evaporator where it condenses and releases its condensation heat into the container and during the absorption of the working agent vapor by the sorbent, the sorbent is cooled by the evaporation of a second liquid in contact with an outside surface of the sorbent container.

2. The method according to claim 1, characterized in that the liquid to be cooled in the container takes up the condensation heat released by the working agent vapor during the regeneration of the sorbent.

3. A liquid cooler with a sorbent in a sorbent container, which is connected, via a vapor conduit that can be sealed off, to an evaporator for the evaporation and liquefaction of a working agent vapor, characterized in that the evaporator is coupled to a container that can hold a liquid which is cooled via the evaporator and which absorbs the condensation heat during regeneration of the sorbent, the evaporator further including a suction conduit, which can be closed, that empties in the evaporator, and through this conduit, the sorbent container can be evacuated.

4. The liquid cooler according to claim 3, characterized in that the evaporator is built into the container in such a way that only a part of the container volume is cooled and the liquid remains to a great extent uncooled in the remaining container part.

5. The liquid cooler according to claim 3, characterized in that the sorbent container has a retention device for aqueous liquids in the outside area, which is used to cool the sorbent.

6. The liquid cooler according to claim 3, characterized in that the vapor conduit, which can be sealed off, contains a check valve that permits the working agent vapor to flow unhindered from the sorbent to the evaporator and that releases the counter flow direction only by manual opening.

7. The liquid cooler according to claim 3, characterized in that the evaporator has components which distribute the liquid working agent on the surface of the evaporator and form an unhindered flow path for the working agent vapor flowing away.

8. The liquid cooler according to claim 3, characterized in that in its outside cover, which is in contact with the liquid, the evaporator has a smooth surface without retention indentations so that the liquid can be drained, residue-free, from the container.

9. The liquid cooler according to claim 3, characterized in that in its lower area, the container has thermal insulation against heating from the outside.

* * * * *